(12) United States Patent
Yan et al.

(10) Patent No.: US 11,881,890 B2
(45) Date of Patent: Jan. 23, 2024

(54) ELECTRICAL LAYER SUBNETWORK CONNECTION PROTECTION METHOD, APPARATUS, AND SYSTEM

(71) Applicant: HUAWEI TECHNOLOGIES CO., LTD., Shenzhen (CN)

(72) Inventors: Jun Yan, Shenzhen (CN); Guang Xie, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 17/850,386

(22) Filed: Jun. 27, 2022

(65) Prior Publication Data

US 2022/0329316 A1 Oct. 13, 2022

Related U.S. Application Data

(63) Continuation of application No. PCT/CN2020/137820, filed on Dec. 19, 2020.

(30) Foreign Application Priority Data

Dec. 31, 2019 (CN) .......................... 201911405953.5

(51) Int. Cl.
*H04B 10/00* (2013.01)
*H04B 10/032* (2013.01)
(Continued)

(52) U.S. Cl.
CPC ..... *H04B 10/032* (2013.01); *H04B 10/07955* (2013.01)

(58) Field of Classification Search
CPC ............................ H04B 10/03; H04B 10/032
See application file for complete search history.

(56) References Cited

U.S. PATENT DOCUMENTS 10,390,116 B1 * 8/2019 Fifer ................... H04L 7/042
2013/0266306 A1 * 10/2013 Kozaki ................ H04B 10/272
398/5
(Continued)

FOREIGN PATENT DOCUMENTS

CN 1622516 A 6/2005
CN 105635859 A 6/2016
(Continued)

OTHER PUBLICATIONS

HuMing, Optical Line Automatic Switching Protection (OLP) System-building Programme, Telecom Engineering Technics and Standardization, 2008, 4 pages.
(Continued)

*Primary Examiner* — Daniel G Dobson
(74) *Attorney, Agent, or Firm* — HAUPTMAN HAM, LLP

(57) ABSTRACT

An electrical layer subnetwork connection protection includes determining, by a network device including a processor, signal status information based on a power of an obtained optical signal. The signal status information is used to indicate a state of a subnetwork connection carrying the optical signal. The method also includes filtering, by the network device, the signal status information based on a preset first threshold. The first threshold indicates a minimum duration in which the optical signal is in a valid state. The method further includes determining, by the network device based on the filtered signal status information, whether to switch a currently used first clock to a second clock different from the clock. The first clock or the second clock is used to initialize connection monitoring information in response to the determination of whether to switch the currently used first clock to the second clock.

20 Claims, 7 Drawing Sheets

(51) Int. Cl.
*H04B 10/079* (2013.01)
*H04J 14/00* (2006.01)

(56) References Cited

U.S. PATENT DOCUMENTS

2015/0003842 A1* 1/2015 Chen ............... H04L 7/0337
398/155
2016/0142136 A1 5/2016 Izumi

FOREIGN PATENT DOCUMENTS

| | | |
|---|---|---|
| CN | 106301857 A | 1/2017 |
| CN | 107483138 A | 12/2017 |
| CN | 109391319 A | 2/2019 |
| EP | 2852087 A1 | 3/2015 |

OTHER PUBLICATIONS

Liang Nawei, Describe the monitoring function of SDH frame overheads, RadioandTelevision Information, Jun. 15, 2009, with an English Abstract, 4 pages.
International Search Report issued in corresponding International Application No. PCT/CN2020/137820, dated Mar. 17, 2021, pp. 1-10.
Chinese Office Action issued in corresponding Chinese Application No. 201911405953.5, dated Jan. 4, 2022, pp. 1-6.
Chinese Notice of Allowance issued in corresponding Chinese Application No. 201911405953.5, dated Jun. 15, 2022, pp. 1-4.

* cited by examiner

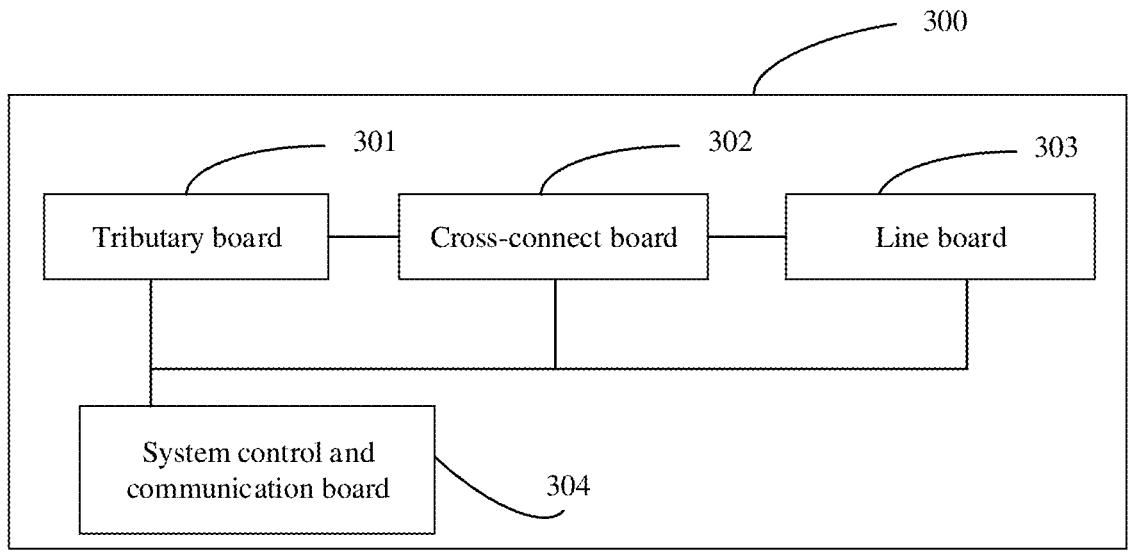

FIG. 2

S401: A network device determines signal status information based on a power of an obtained optical signal, where the signal status information is used to indicate a state of a subnetwork connection carrying the optical signal

S403: The network device filters the signal status information based on a preset first threshold, where the first threshold indicates minimum duration in which the optical signal is in a valid state

S405: The network device determines, based on the filtered signal status information, whether to switch a currently used clock, where the clock is used to initialize connection monitoring information

FIG. 3

ELECTRICAL LAYER SUBNETWORK CONNECTION PROTECTION METHOD, APPARATUS, AND SYSTEM

CROSS-REFERENCE TO RELATED APPLICATIONS

This application is a continuation of International Patent Application No. PCT/CN2020/137820, filed on Dec. 19, 2020, which claims priority to Chinese Patent Application No. 201911405953.5, filed on Dec. 31, 2019. The disclosures of the aforementioned applications are hereby incorporated by reference in their entireties.

TECHNICAL FIELD

The present invention relates to the field of communication network trail protection technologies, and in particular, to an electrical layer subnetwork connection protection method, an apparatus, and a system.

BACKGROUND

In a communication network, to improve reliability of a service trail, a corresponding protection trail is usually configured for a working trail. In a network 100 shown in FIG. 1a, a trail 103 (N1-N2-N3-N4-N5-N9) is used to transmit a service from a device N1 to a device N9. To prevent service transmission from being interrupted due to a fault of a device (for example, N2) or a link (for example, a link N1-N2) on the trail 103, or the like, a protection trail is configured for the trail 103. Correspondingly, the trail 103 is referred to as a working trail. Specifically, a subnetwork connection 104a, a subnetwork connection 104b, and a subnetwork connection 104c are configured for the working trail. The subnetwork connection 104a is used to protect a subnetwork connection N1-N2-N3 (also referred to as a trail section), the subnetwork connection 104b is used to protect a subnetwork connection N3-N4, and the subnetwork connection 104c is used to protect a subnetwork connection N5-N9. In such a multi-protection cascaded protection solution, a plurality of faults may be prevented. In other words, each subnetwork connection may be protected from a fault, and accordingly, normal transmission of a service is not affected.

SUMMARY

In a solution provided in a conventional technology, a fault is transmitted to a downstream device. Therefore, the solution has a problem that a normal subnetwork connection is incorrectly switched. In this case, embodiments of this application provide an electrical layer subnetwork connection protection method, an apparatus, and a system.

According to a first aspect, an embodiment of this application discloses an electrical layer subnetwork connection protection method. The method includes:
  determining, by a network device, signal status information based on a power of an obtained optical signal, where the signal status information is used to indicate a state of a subnetwork connection carrying the optical signal;
  filtering, by the network device, the signal status information based on a preset first threshold, where the first threshold indicates minimum duration in which the optical signal is in a valid state; and
  determining, by the network device, based on the filtered signal status information, whether to switch a currently used clock, where the clock is used to initialize connection monitoring information.

In conclusion, the network device determines, based on the power of the optical signal, whether to perform clock switching, so that a correct clock is used to initialize connection monitoring information of the network device and a downstream neighboring node. Therefore, a downstream device can correctly determine a protection state of a subnetwork connection corresponding to the downstream device, to reduce a probability of incorrect switching.

In a possible design, the determining, by a network device, signal status information based on a power of an obtained optical signal specifically includes: determining, by the network device, the signal status information based on a power value of the optical signal; or converting the optical signal into an electrical signal, and determining, by the network device, the signal status information based on an amplitude of the electrical signal.

In a possible design, the method further includes: switching the currently used clock after the network device determines to switch the currently used clock; and initializing the connection monitoring information by using a clock after switching.

In a possible design, the method further includes:
  obtaining, by the network device, another piece of connection monitoring information from the optical signal;
  determining, by the network device, another piece of status information of the subnetwork connection based on the another piece of connection monitoring information; and
  determining valid status information of the subnetwork connection based on a preset second threshold and the another piece of status information of the subnetwork connection, where the valid status information is used to determine whether the network device needs to perform protection switching on the subnetwork connection, and the second threshold indicates minimum duration in which the subnetwork connection is in a valid state.

The valid status information of the subnetwork connection is further determined, so that the valid status information is used to determine whether protection switching needs to be performed, and the network device may further reduce a probability of incorrect switching.

There are several methods for determining the valid status information of the subnetwork connection. A first example method specifically includes: determining an instantaneous state of the subnetwork connection for a plurality of times within the preset second threshold; and when one of the plurality of instantaneous states of the subnetwork connection is different from another instantaneous state, determining that the valid status information of the subnetwork connection is that the subnetwork connection is normal. A second example method specifically includes: determining that an instantaneous state of the subnetwork connection is a first state, where the first state is that the subnetwork connection is faulty, or the first state is that the subnetwork connection is degraded; after waiting for the preset second threshold, determining that the status information of the subnetwork connection is a second state; and when the second state is different from the first state, determining that the valid status information of the subnetwork connection is that the subnetwork connection is normal.

The another piece of status information of the subnetwork connection includes one or more of the following states: The subnetwork connection is normal, the subnetwork connection is faulty, or the subnetwork connection is degraded. A data frame is an optical transport unit frame, a flexible optical transport network frame, a flexible Ethernet frame, or a synchronous digital signal frame. The connection monitoring information includes one or more of the following overheads: a status indication, a trail trace identifier, or bit-interleaved parity. The signal status information includes one or more of the following states: a signal normal state or a signal failure state.

According to a second aspect, an embodiment of this application provides a signal processing apparatus. The signal processing apparatus includes a processor and a memory. The memory stores program code. The processor is configured to read and execute the program code stored in the memory, to implement the method according to the first aspect or any specific design of the first aspect.

According to a third aspect, an embodiment of this application provides a network device. The network device includes the signal processing apparatus according to the second aspect and an optical receiver. The optical receiver is configured to receive an optical signal.

According to a fourth aspect, an embodiment of this application provides a communication system. The communication system includes a first network device and a second network device.

The first network device is configured to: receive an optical signal; determine signal status information based on a power of the optical signal, where the signal status information is used to indicate a state of a subnetwork connection carrying the optical signal; filter the signal status information based on a preset first threshold, where the first threshold indicates minimum duration in which the optical signal is in a valid state; determine, based on the filtered signal status information, whether to switch a currently used clock, where the clock is used to initialize connection monitoring information; and send the initialized connection monitoring information to the second network device.

The second network device is configured to: receive the connection monitoring information; determine status information of another subnetwork connection based on the connection monitoring information, where the another subnetwork connection is a subnetwork connection between the first network device and the second network device; and determine valid status information of the another subnetwork connection based on a preset second threshold and the status information of the another subnetwork connection, where the valid status information is used to determine whether the second network device needs to perform protection switching on the another subnetwork connection, and the second threshold indicates minimum duration in which the another subnetwork connection is in a valid status.

In the communication system, there are several methods for determining valid status information of a subnetwork connection. For details, refer to related descriptions in the first aspect. Details are not described herein again.

According to a fifth aspect, an embodiment of this application provides another electrical layer subnetwork connection protection method. The method includes:

receiving an optical signal; and
obtaining connection monitoring information from the optical signal;
determining status information of a subnetwork connection of the optical signal based on the connection monitoring information; and
determining valid status information of the subnetwork connection based on a preset second threshold and the status information of the subnetwork connection, where the valid status information is used to determine whether the network device needs to perform protection switching on the subnetwork connection, and the second threshold indicates minimum duration in which the subnetwork connection is in a valid state.

By confirming validity of the obtained connection monitoring information, the network device may reduce a probability of incorrect switching.

In conclusion, according to technologies provided in the embodiments of this application, signal status information is obtained based on an optical power, the signal status information is filtered, and/or validity of a state of a subnetwork is confirmed, so that a probability of incorrect switching is reduced, and even incorrect switching of a network device is avoided.

BRIEF DESCRIPTION OF DRAWINGS

FIG. 2 is a schematic diagram of a possible hardware structure of a network device;

FIG. 3 is a schematic flowchart of an electrical layer subnetwork connection protection method;

DESCRIPTION OF EMBODIMENTS

A device form and a service scenario that are described in embodiments of this application are intended to describe technical solutions in the embodiments of the present invention more clearly, and do not constitute a limitation on the technical solutions provided in the embodiments of the present invention. A person of ordinary skill in the art may learn that, as the device form evolves and a new service scenario appears, the technical solutions provided in the embodiments of this application are also applicable to a similar technical problem.

Figure 1A:
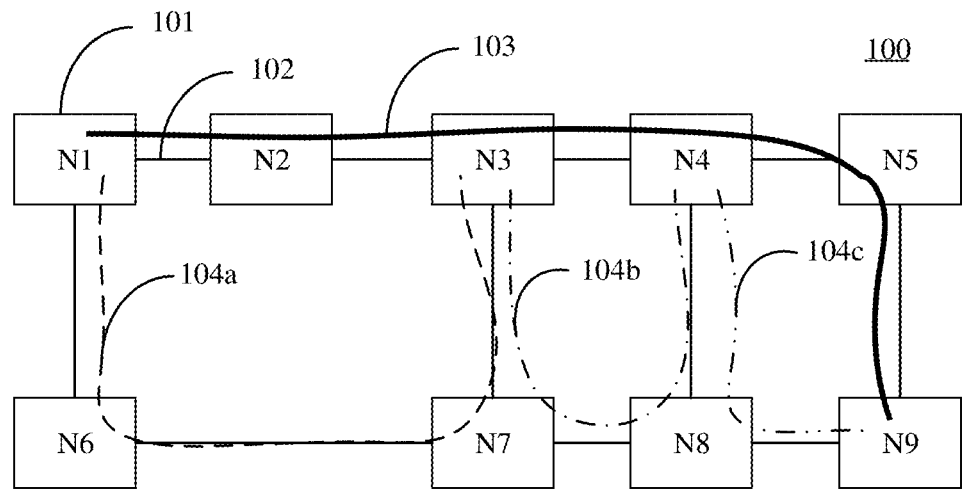
FIG. 1a is a schematic diagram of cascade protection.

The technical solutions provided in this application are applicable to an optical transport network (OTN) scenario in which a trail for transmitting a service has subnetwork connection protection, for example, a network scenario with cascade protection, as shown in FIG. 1a. In an example shown in FIG. 1a, a network 100 includes nine devices (devices N1-N9) and a plurality of links (for example, a link N1-N2 102, and other links not marked with reference signs) that connect these devices. A trail 103 includes an ordered device sequence and is used for transmit service data from a source device (for example, the device N1) to a destination device (for example, the device N9). Specifically, the trail 103 is N1-N2-N3-N4-N5-N9. To prevent a fault of a device or a link from affecting service transmission, in the example shown in FIG. 1a, a protection trail is configured for the working trail 103. Specifically, subnetwork connections 104a, 104b, and 104c are configured for the trail 103. Each protected section of the trail 103 is also referred to as a subnetwork connection, a trail section, or a trail path. To simplify subsequent descriptions, the section is collectively referred to as a subnetwork connection hereinafter. In the example shown in FIG. 1a, the trail 103 includes three subnetwork connections, namely, N1-N2-N3, N3-N4, and N5-N9. Correspondingly, the three subnetwork connections are protected respectively by the subnetwork connections 104a, 104b, and 104c.

It should be noted that the foregoing scenario may be specifically used in a specific scenario, for example, a backbone transport network scenario, a data center transport network scenario, or a wireless backhaul/fronthaul scenario. This is not limited in this application. Specifically, the technical solutions provided in this application may be used in a device for protection switching in the foregoing working trail, for example, the device N3, the device N4, or the device N9. It should also be noted that a specific frame format used by an OTN may be an optical transport unit (OTU) frame, a flexible OTN (FlexO) frame, or the like. This is not specifically limited in this application.

Figure 1B:
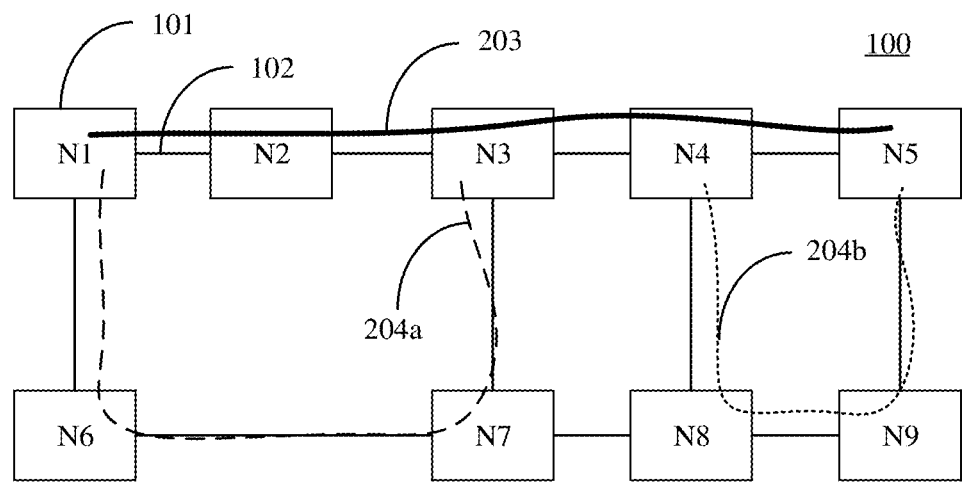
FIG. 1B is a schematic diagram of another possible application scenario according to an embodiment of this application.

FIG. 1B is a schematic diagram of another possible application scenario according to an embodiment of this application. A network topology shown in FIG. 1B (namely, a connection relationship between devices) is the same as a network shown in FIG. 1a. In FIG. 1B, a working trail 203 is N1-N2-N3-N4-N5. Correspondingly, two protection subnetwork connections are configured for the working trail 203. Specifically, a protection subnetwork connection 204a (N1-N6-N7-N3) is configured for a subnetwork connection N1-N2-N3. A protection subnetwork connection 204b (N4-N8-N9-N5) is configured for a subnetwork connection N4-N5. The technical solutions provided in this application are also applicable to such a non-cascaded subnetwork connection protection (SNCP) scenario. Specifically, the technical solutions provided in this application may be applied to non-head node devices in the foregoing working trail, for example, network devices for protection switching, such as, the devices N4 and N5 in FIG. 1B.

It should be noted that whether a network device needs to perform protection switching on a trail needs to be set based on a specific scenario. Therefore, each device in the network needs to have a subnetwork connection protection function disclosed in this application. However, in a specific application, whether a specific method needs to be performed depends on a specific configuration. This is not limited in this application.

It should also be noted that the technical solutions provided in this application may further be applied to another type of transport network, for example, a synchronous digital hierarchy (SDH) network, a flexible Ethernet (FlexE), or a metro transport network (MTN).

FIG. 2 is a schematic diagram of a possible hardware structure of a network device, for example, the device N3 in FIG. 1a. Specifically, a device 300 includes a tributary board 301, a cross-connect board 302, a line board 303, an optical layer processing board (not shown in the figure), and a system control and communication board 304. According to specific requirements, types and quantities of boards included in a network device may be different. For example, a network device serving as a core node may have no tributary board 301. For another example, a network device serving as an edge node has a plurality of tributary boards 301, or has no cross-connect board 302. For still another example, a network device that supports only an electrical layer function may have no optical layer processing board.

The tributary board 301, the cross-connect board 302, and the line board 303 are configured to process an electrical layer signal of a transport network. The tributary board 301 is configured to receive and send various client services such as an SDH service, a packet service, an Ethernet service, and a fronthaul service. Further, the tributary board 301 may be divided into a client-side optical module and a signal processor. The client-side optical module may be an optical transceiver, and is configured to receive and/or send service data. The signal processor is configured to map service data into a data frame and demap the data frame to obtain the service data. The cross-connect board 302 is configured to implement exchange of data frames, and complete exchange of one or more types of data frames. The line board 303 mainly processes a data frame on a line side. Specifically, the line board 303 may be divided into a line-side optical module and a signal processor. The line-side optical module may be a line-side optical transceiver, and is configured to receive and/or send a data frame. The signal processor is configured to multiplex and demultiplex a data frame on the line side, or map and demap a data frame. The system control and communication board 304 is configured to control a system. Specifically, information may be collected from different boards through a backplane, or a control instruction is sent to a corresponding board through a backplane. It should be noted that, unless otherwise specified, there may be one or more specific components (for example, a signal processor). This is not limited in this application. It should also be noted that types, functional designs, and quantities of boards included in a device are not limited in this application. It should be noted that, in a specific implementation, the two boards may be designed as one board. In addition, the network device may further include a standby power supply, a cooling fan, and the like.

For example, FIG. 1a is used to describe the conventional technology and a problem in the conventional technology. When the subnetwork connection N1-N2-N3 is faulty (for example, an optical fiber of the link N1-N2 is cut off, the device N2 is unexpectedly powered off, or an optical fiber at an internal outlet of the device is faulty), the device N3 determines, based on connection monitoring information carried in a data frame, whether the subnetwork connection is faulty. After determining that a fault occurs, the device N3 works with the device N1 to switch a service transmission trail from N1-N2-N3 to N1-N6-N7-N3. Therefore, interruption of service transmission due to a fault is avoided. In the conventional technology, it takes time (for example, at a millisecond (ms) level) for the device N3 to determine a fault and complete protection switching. Therefore, before the protection switching is completed, the connection monitoring information sent by the device N3 to a downstream device may be inaccurate. In this case, downstream devices (also referred to as nodes) such as N4 and N9 may also detect a fault. Accordingly, protection switching is performed. For example, if the device N9 detects a fault, N9 works with N4 to switch the service transmission from N4-N5-N9 to N4-N8-N9. However, this section is actually not faulty and should not be switched. This case in which a subnetwork connection that should not be switched is subject to protection switching is referred to as incorrect switching. In an extreme case, when only the subnetwork connection N1-N2-N3 is faulty, protection switching may be performed on all downstream devices that have a subnetwork connection protection function. In this solution, incorrect switching affects service performance to a certain extent. For example, a service transmission delay changes unnecessarily. In addition, in this solution, a plurality of switchings occurring at different time points may be caused. As a result, overall protection switching time of the service becomes longer, and there is a risk of exceeding a protection switching time requirement of the service (for example, 50 ms).

To resolve the foregoing incorrect switching problem, this application provides a new subnetwork connection protection solution. In this solution, a signal of an optical layer is used to quickly detect a link fault, to ensure that a downstream device that is not faulty may correctly determine a state of a subnetwork connection. Therefore, a probability of incorrect switching is reduced as much as possible, and even incorrect switching is avoided completely.

FIG. 3 is a schematic flowchart of an electrical layer subnetwork connection protection method. As shown in FIG. 3, the method includes the following steps.

Step 401: A network device determines signal status information based on a power of an obtained optical signal, where the signal status information is used to indicate a state of a subnetwork connection carrying the optical signal.

Specifically, an optical signal sent by another device may be received by an optical transceiver (or an optical receiver) of the tributary board or the line board in the device shown in FIG. 2.

Specifically, the network device determines a state of a current section of subnetwork connection based on the power of the optical signal. For example, if the power of the optical signal is less than a specific threshold, it is determined that the subnetwork connection is faulty. If the power of the optical signal is greater than a specific threshold, it is determined that the subnetwork connection is normal. A specific threshold needs to be designed and selected based on a specific service scenario and a specific network scenario. This is not limited in this application. The current section of subnetwork connection refers to a subnetwork connection between a network device that sends the optical signal and a network device that receives the optical signal.

Figure 5:
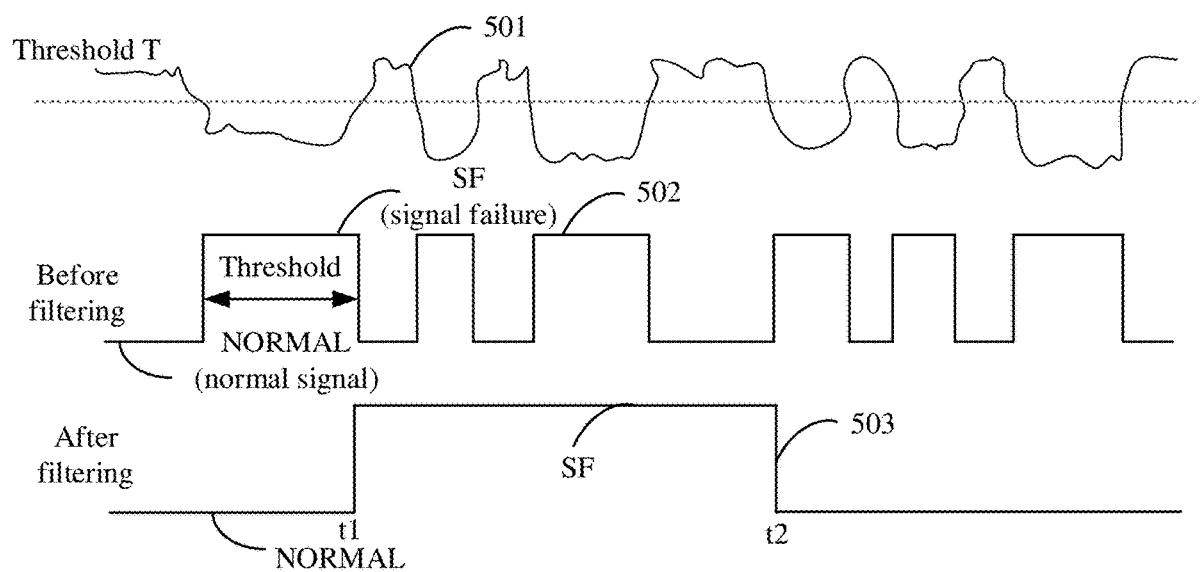
FIG. 5 is a schematic diagram of processing of signal status information corresponding to the embodiment shown in FIG. 4.

It should be noted that the signal status information may continuously change with the power of the received optical signal. Specifically, the signal status information is manifested as a curve related to time; or the signal status information is manifested as a curve related to the power of the optical signal. FIG. 5 shows a specific example of the signal status information. Details are not described herein.

It should also be noted that the state of the subnetwork connection may be that the subnetwork connection is faulty or the subnetwork connection is normal. Alternatively, the state of the subnetwork connection may be referred to as a signal fault state or a signal normal state. For simplicity, that the subnetwork connection is faulty or a signal failure state is collectively referred to as SF (Signal Failure) hereinafter, and the signal normal state or that the subnetwork connection is normal is referred to as NORMAL.

Step 403: The network device filters the signal status information based on a preset first threshold, where the first threshold indicates minimum duration in which the optical signal is in a valid state.

The power of the optical signal received by the network device may change transiently. Therefore, the obtained signal status information needs to be filtered first and then used by the network device. Specifically, the network device determines, based on the preset first threshold, whether a change of the signal status information is a transient change. A state whose duration is less than the first threshold is considered as a temporary transient change and is filtered out. That is, the first threshold represents minimum duration in which the optical signal is in a valid state. The first threshold may be tens of microseconds or hundreds of microseconds, to quickly determine the status information of the subnetwork connection. FIG. 5 shows a specific example of filtration. Details are not described herein.

Step 405: The network device determines, based on the filtered signal status information, whether to switch a currently used clock, where the clock is used to initialize connection monitoring information.

Specifically, the network device determines, based on the filtered signal status information, whether to perform clock switching. For example, if the signal status information changes from NORMAL to SF, the network device switches a line clock to a local clock. The line clock is clock information transmitted from an upstream data frame, and is used to parse a data frame. The local clock is generated by the device. When the subnetwork connection is faulty, the network device cannot normally obtain clock information sent by an upstream device and then cannot correctly parse a data frame. In this case, error parsing may occur and cause incorrect switching. To ensure that the network device may send correct connection monitoring information to a downstream device to ensure that the downstream device obtains correct information for determining whether to perform protection switching, the network device needs to perform clock switching. If the signal status information changes from SF to NORMAL, the network device switches the local clock to the line clock, and the line clock may be reused.

In conclusion, the network device determines, based on the power of the optical signal, whether to perform clock switching, so that a correct clock is used to initialize connection monitoring information of the network device and a downstream neighboring node. Therefore, a downstream device can correctly determine a protection state of a subnetwork connection corresponding to the downstream device, to reduce a probability of incorrect switching. For example, in the working trail 103 shown in FIG. 1a, if only the subnetwork connection N1-N2-N3 is faulty and if the device N3 may perform clock switching as early as possible, to transmit the connection monitoring information initialized by a normal clock to a downstream device, the device N4 may determine that the subnetwork connection N3-N4 is normal, so that incorrect switching of the section N3-N4 is not caused.

It should be noted that the terms "first", "second", and the like in this application are intended to distinguish between similar objects but do not necessarily indicate a specific order or sequence. It should be understood that, the data termed in such a way is interchangeable in a proper circumstance, so that the embodiments described herein can be implemented in an order not described in this application. The term "and/or" is used to describe an association relationship for describing associated objects and represents that three relationships may exist. For example, A and/or B may represent the following cases: Only A exists, both A and B exist, and only B exists. A specific operation method in a method embodiment may also be applied to an apparatus embodiment. On the contrary, function descriptions of a component in the apparatus embodiment are also applicable to related descriptions in the method embodiment.

It should be further noted that, unless otherwise specified, specific descriptions of some technical features in an embodiment may also be applied to explaining corresponding technical features mentioned in another embodiment. For example, detailed descriptions of a method for determining signal status information in an embodiment are applicable to determining signal status information in another embodiment. For another example, in an embodiment, a specific implementation of confirming validity of a state of a subnetwork connection is applicable to confirming validity of a subnetwork connection in another embodiment.

The technical solutions of this application are further described based on common aspects of this application that are described above.

Figure 4:
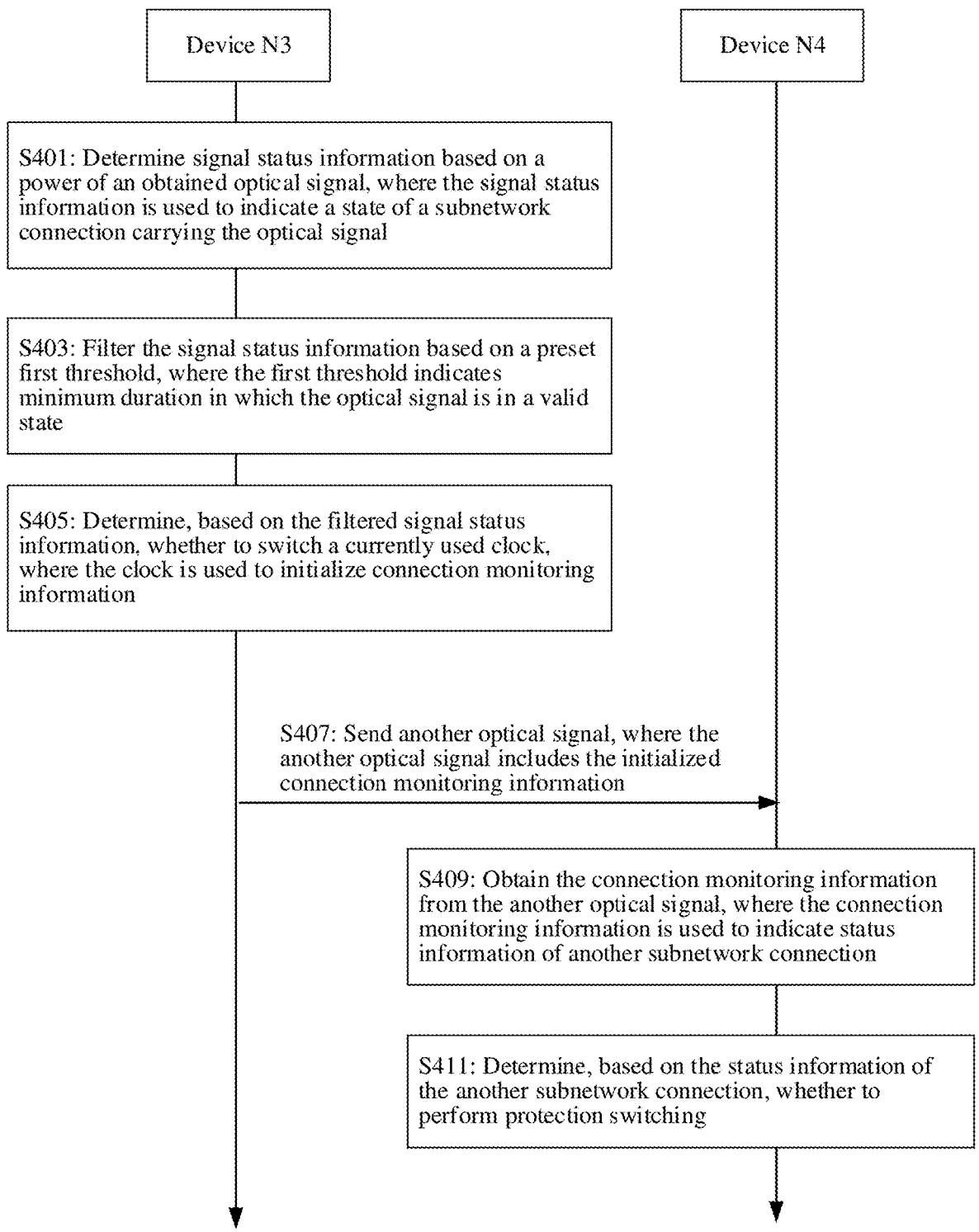
FIG. 4 is a schematic flowchart of a possible electrical layer subnetwork connection protection method according to an embodiment of this application.

FIG. 4 is a schematic flowchart of a possible electrical layer subnetwork connection protection method according to an embodiment of this application. This embodiment provides related descriptions of an electrical layer subnetwork connection protection method, a device, and a system. Specifically, a network and a trail shown in FIG. 1a are used as an example. It is assumed that a link N2-N3 is faulty. A method and a procedure of the devices N3 and N4 are provided. It should be noted that the subnetwork connection N1-N2-N3 is faulty. In this case, the device N3 needs to perform protection switching, but the subnetwork connection N3-N4 is not faulty. Therefore, the device N4 does not need to perform protection switching.

As shown in FIG. 4, the method disclosed in this embodiment includes the following steps.

S401: Determine signal status information based on a power of an obtained optical signal, where the signal status information is used to indicate a state of a subnetwork connection carrying the optical signal.

S403: Filter the signal status information based on a preset first threshold, where the first threshold indicates minimum duration in which the optical signal is in a valid state.

S405: Determine, based on the filtered signal status information, whether to switch a currently used clock, where the clock is used to initialize connection monitoring information.

The three steps are performed by the network device N3. For detailed descriptions of these three steps, refer to related descriptions of FIG. 3. Details are not described herein again.

For a better understanding of the solution, the solution is further described with reference to the schematic diagram of FIG. 5. As shown in FIG. 5, a curve 501 gives an example of a power curve of an optical signal detected by the device N3. In a specific implementation, the device N3 may directly detect the power of the received optical signal. It should be noted that in step S401, the signal status information may be determined by directly obtaining a power value. Alternatively, the device N3 may convert the optical signal into an electrical signal, and then determine the signal status information based on an amplitude (for example, a voltage or a current) of the electrical signal. A curve 502 gives an example of signal status information determined based on the curve 501. In this example, the power value of the optical power is compared with a preset power threshold T. When the power at a specific time point is greater than T, it is determined that the signal status information is NORMAL. When the power is less than T, it is determined that the signal status information is SF. For example, T is set to 30 dB, 35 dB, or another value. A specific value of T needs to be selected based on an actual network. This is not limited in this application.

It can be learned from the curve 502 that because the signal status information is determined by detecting the power of the optical signal or in an equivalent manner, the signal status information changes frequently. Therefore, to further filter out unstable state information, the curve 502 is further filtered in step S403. Specifically, whether a specific state is a stable state is determined based on a preset first threshold (marked as a threshold in FIG. 5). When duration of a specific state is greater than the threshold, the state is considered as a stable state. Otherwise, it is considered that the state is non-stable and should be filtered out. A curve 503 in FIG. 5 is obtained by filtering the curve 502 based on a threshold.

After the filtered signal status information is obtained, the device N3 determines, based on the filtered signal status information, whether to perform clock switching. The curve 503 is used as an example. At a time point t1, the device N3 detects that the signal status information changes from NORMAL to SF. Then, the device N3 needs to perform clock switching. Specifically, a clock (line clock) carried in a data frame sent by an upstream device is switched to a local clock. After clock switching, the device N3 initializes connection monitoring information by using a current clock. The connection monitoring information may specifically include information in the following table (Table 1). It should be noted that in actual application, the network device may select one or more pieces of the information as the connection monitoring information. After receiving this information, the downstream device determines, based on this information, whether to perform protection switching. It should be understood that another piece of information for connection monitoring, although not listed in Table 1, falls within the protection scope of this application.

It should be noted that, similarly, when the device N3 detects at a time point t2 that the signal status information changes from SF to NORMAL, the device N3 switches the local clock back to the line clock, to keep pace with the clock of the upstream device, and implement accurate service data transmission.

TABLE 1

Examples of information that may be included in the connection monitoring information

| Name | Description |
| --- | --- |
| Trail trace identifier (TTI) | The TTI is used to place trail trace information of an OTN frame. |
| Bit-interleaved parity (BIP) | The BIP is used for data verification, for example, bit-interleaved parity 8 BIP-8. Alternatively, BIP of another length may be used. This is not limited in this application. |
| Status indication (STAT) | The STAT is used to identify signal status information, such as an alarm indication signal or an idle signal indication transmitted to a downstream device. This field is set to 001 during initialization, to indicate that a monitoring channel is in use and there is no input alignment error. |

The device N3 may send the connection monitoring information in a manner specified in a standard. For example, in an international standard defined by the International Telecommunication Union-Telecom standardization sector (ITU-T), a tandem connection monitoring (TCM) field is used to transmit the connection monitoring information. Alternatively, the device N3 may define an overhead field to transmit the information.

S407: Send another optical signal, where the another optical signal includes the initialized connection monitoring information.

Specifically, the device N3 sends the optical signal carrying the initialized connection monitoring information to the downstream device. In this example, the downstream device is N4. It should be noted that the connection monitoring information monitors a connection state of a current device and a downstream device thereof. In this example, the subnetwork connection N3-N4 is not faulty. The device N3 initializes the connection monitoring information by using the local clock (a correct clock). Therefore, the device N4 may correctly parse the connection monitoring information.

S409: Obtain the connection monitoring information from the another optical signal, where the connection monitoring information is used to indicate status information of another subnetwork connection.

After receiving the another optical signal, the device N4 obtains the connection monitoring information from the another optical signal. This connection monitoring information indicates whether a subnetwork connection (namely, the another subnetwork connection) between the device N4 and the upstream device is normal. It should be noted that, although the device N3 sends the initialized connection monitoring information, this information has been transmitted and is not necessarily the same as the sent information. It should also be noted that there may be one or more other devices between the device N4 and the device N3.

S411: Determine, based on the status information of the another subnetwork connection, whether to perform protection switching.

In this example, if the device N3 timely initializes monitoring information, the connection monitoring information obtained by the device N4 correctly indicates that the current subnetwork connection (namely, N3-N4) is normal. For example, the STAT is 001. Therefore, the device N4 does not perform switching. It should be noted that if the device N3 cannot timely initialize the connection monitoring information, the device N4 may perform some other operations to avoid incorrect switching. For details, refer to the embodiment shown in FIG. 6. Details are not described herein again.

It should be noted that the device N4 is used as an example in this embodiment. Actually, the description of the device N4 is also applicable to another device corresponding to a subnetwork connection that is not faulty, for example, the device N9. In addition, this solution is applicable to another scenario, for example, the scenario shown in FIG. 1B.

In the solution provided in this embodiment, whether the subnetwork connection between the current device and the upstream device is faulty is quickly determined by using the optical signal, and then the connection monitoring information is initialized by using the correct clock to correctly indicate the state of the subnetwork connection between the current device and the downstream device. Therefore, the downstream device that has no subnetwork connection fault is prevented from performing incorrect switching. In addition, protection switching time in this solution is less than that in the conventional technology by avoiding incorrect switching.

Figure 6:
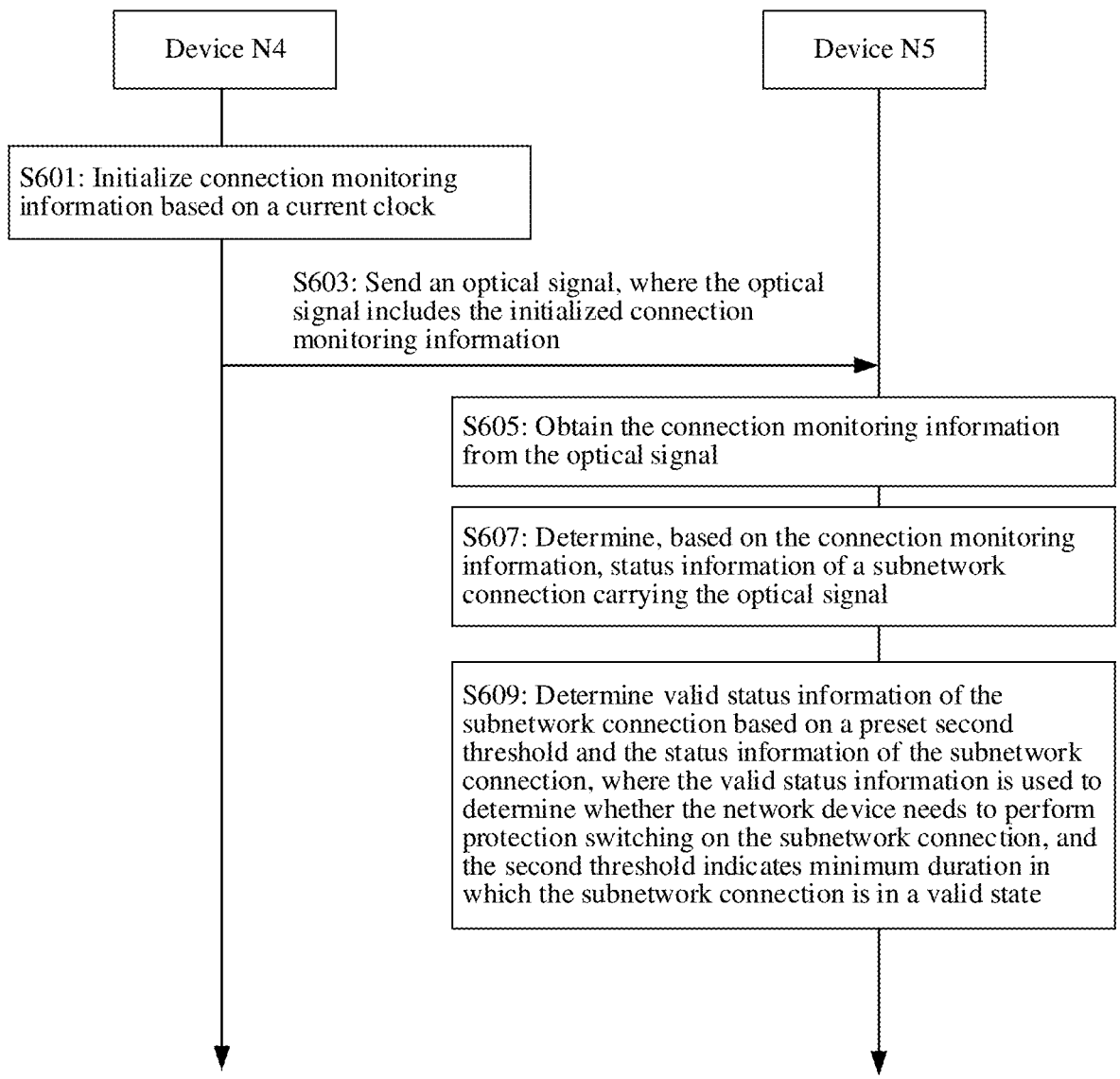
FIG. 6 is a schematic flowchart of another possible electrical layer subnetwork connection protection method according to an embodiment of this application.

FIG. 6 is a schematic flowchart of another possible electrical layer subnetwork connection protection method according to an embodiment of this application. This embodiment provides related descriptions of an electrical layer subnetwork connection protection method, a device, and a system. Specifically, the network and the trail shown in FIG. 1B are used as an example. It is assumed that the link N1-N2 is faulty. A method and a procedure of the devices N4 and N5 are provided. It should be noted that the subnetwork connection N1-N2-N3 is faulty. In this case, the device N4 needs to perform protection switching, but the subnetwork connection N4-N5 is not faulty. Therefore, the device N5 does not need to perform protection switching.

As shown in FIG. 6, the method disclosed in this embodiment includes the following steps.

S601: Initialize connection monitoring information based on a current clock;

Specifically, the device N4 initializes the connection monitoring information by using the currently used clock. For possible content of the connection monitoring information, refer to Table 1 and related descriptions thereof. Details are not described herein again. It should be noted that in this embodiment, a corresponding protection subnetwork connection is not provided for a link between the devices N3 and N4. Optionally, the network device N3 may generate connection monitoring information and send the connection monitoring information to the device N4, to monitor a state of a subnetwork connection between the device N3 and the device N4.

S603: Send an optical signal, where the optical signal includes the initialized connection monitoring information.

Specifically, the device N4 sends the initialized connection monitoring information through the optical signal, to monitor a state of a connection between the device and a downstream device.

S605: Obtain the initialized connection monitoring information from the optical signal.

S607: Determine, based on the connection monitoring information, status information of a subnetwork connection carrying the optical signal.

S609: Determine valid status information of the subnetwork connection based on a preset second threshold and the status information of the subnetwork connection, where the valid status information is used to determine whether the network device needs to perform protection switching on the subnetwork connection, and the second threshold indicates minimum duration in which the subnetwork connection is in a valid state.

Specifically, the device N5 receives the optical signal and obtains the connection monitoring information from the optical signal. Then, the device N5 determines a state of a corresponding subnetwork connection based on the connection monitoring information. However, the device N5 does not directly determine, based on the status information of the subnetwork connection, whether to perform protection switching. Instead, the device N5 needs to confirm validity of a state of the subnetwork connection by using the preset second threshold. Then, the status information, subjected to validity confirmation, of the subnetwork connection is used to further determine whether protection switching needs to be performed. It should be noted that the foregoing state of the corresponding subnetwork connection refers to a subnetwork connection that currently carries service data, and the subnetwork connection may be a working subnetwork connection (also referred to as a working trail or a working entity) or a protection subnetwork connection (also referred to as a protection trail or a working entity). This is not specifically limited in this application.

It should be noted that a state of the subnetwork connection that currently carries the service data is a factor to be considered to determine whether a network device needs to perform protection switching, that is, switch from one subnetwork connection to another subnetwork connection. The network device may need to combine other factors, to determine whether to perform protection switching. Specifically, refer to the conventional technology. Details are not described in this application. The following describes a specific manner of determining the valid status information of the subnetwork connection by using the valid status information of the subnetwork connection as the only factor (protection switching is performed only when a valid state is SF) to determine whether protection switching needs to be performed.

Figure 7:
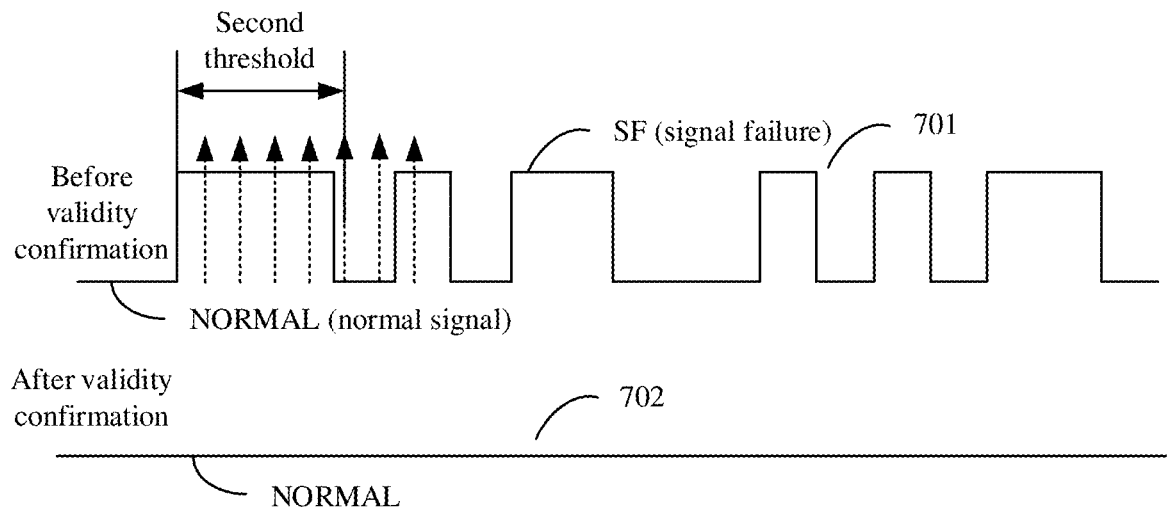
FIG. 7 is a schematic diagram of processing of status information of a subnetwork connection corresponding to an embodiment shown in FIG. 6.

In a possible implementation, a specific value of information of the subnetwork connection is determined for a plurality of times within a preset second threshold time period, to obtain a plurality of instantaneous states of the subnetwork connection. If one of the plurality of instantaneous states of the subnetwork connection is different from another state, it is determined that the state of the subnetwork connection is not changed. FIG. 7 provides a specific example. As shown in FIG. 7, a curve 701 is the status information of the subnetwork connection obtained based on the connection monitoring information. In this example, sampling is performed for five times within the second threshold time period starting from a time point at which a state of the curve 701 starts to change. The last state is not consistent with another state, so that the device N5 determines that the state of the subnetwork connection is still the previous state (namely, a NORMAL state). Subsequent judgments are similar and details are not described herein again. The device N5 obtains a curve 702 through the validity confirmation. It can be learned from the curve that the valid state of the subnetwork connection is NORMAL, and the device N5 does not need to perform protection switching.

In another possible implementation, the device N5 starts timing at a time point at which it is determined that the status information of the subnetwork connection information is a first state (for example, SF). After waiting for the preset second threshold, the device N5 determines again the status information of the subnetwork connection. If a second state is different from the first state (that is, the second state is not SF), it is determined that the valid state of the subnetwork connection is NORMAL, and then it is determined that protection switching is not performed.

In yet another possible implementation, the device N5 further integrally performs validity filtration on the subnetwork connection based on the second threshold and a sampling preset value. Specifically, the device N5 starts a timer (duration of the timer is equal to the second threshold) when determining that the status information of the subnetwork connection changes from NORMAL to SF. N5 then performs sampling at a specific frequency, to obtain an instantaneous state of the subnetwork connection. N5 monitors the instantaneous state of the subnetwork connection. If the instantaneous state of the subnetwork connection changes before the timer stops timing, the timer is restarted to monitor the instantaneous state of the subnetwork connection again. If all sampled instantaneous states of the subnetwork connection are the same when the timer stops timing, it is considered that the valid state of the subnetwork connection is SF; otherwise, it is determined that the valid state is NORMAL.

In this embodiment, the instantaneous state of the subnetwork connection may be any one of the following three states: NORMAL, SF, and subnetwork connection degraded (also referred to as signal degraded (SD)). The three states are used in the foregoing examples. Details are not described herein again. It should be noted that in the second specific implementation, if the first state is SF and the second state is SD, it is considered that the two states are different, and then it is determined that the valid state of the subnetwork connection is NORMAL. Alternatively, it can be considered that the two states are not exactly the same, and then it is determined that the valid state of the subnetwork connection is SD.

It should be noted that a value of the second threshold may be determined based on an actual need. If a network has a requirement for a protection switching time (for example, the protection switching time needs to be within 50 ms), the second threshold may be set to a few ms or tens of ms. If the network has no requirement for a protection switching time, the value of the second threshold may be longer. The value of the second threshold may be set as required. This is not limited in this application. For example, the second threshold may be set to an empirical value that a network device may obtain a stable state of a subnetwork connection. This value may need to change with a location of the network device in a trail. Therefore, the value may be reset each time. For another example, an appropriate second threshold may be preset for a device according to a requirement for a protection switching time and a deployment of an actual network. The latter method is simpler than the former method. This is not limited in this application.

In the technical solution provided in this embodiment, validity filtration is performed on received connection status information, to avoid unnecessary protection switching.

It should be noted that in the solution of this embodiment, method steps of the device N4 may be replaced with steps 401-409 shown in FIG. 4. An advantage of the replacement is that the device N5 may quickly obtain accurate connection monitoring information, to better avoid incorrect switching.

Figure 8:
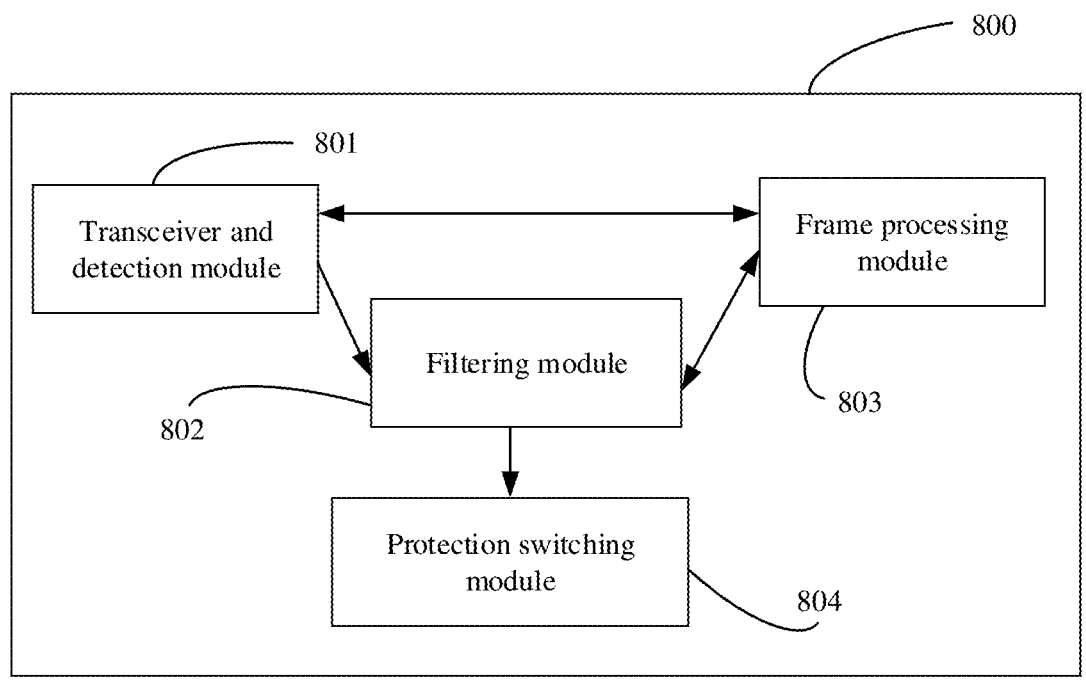
FIG. 8 is a schematic diagram of a possible structure of a device according to an embodiment of this application.

FIG. 8 is a schematic diagram of a possible structure of a device according to an embodiment of this application. As shown in FIG. 8, the device 800 includes a transceiver and detection module 801, a filtering module 802, a frame processing module 803, and a protection switching module 804. The device in this embodiment is configured to implement the method shown in FIG. 3, or the method performed by the device shown in FIG. 4 or FIG. 6. It should be noted that these modules may be divided in other ways. For example, the transceiver and detection module 801 is divided into a transceiver module and a detection module. For another example, the modules 801 and 802 are combined into one module. In addition, the protection switching module 804 and the filtering module 802 are optional modules.

For example, when the device 800 is configured to implement the method shown in FIG. 3, the transceiver and detection module 801 is configured to perform steps S401 and S403, the filtering module 802 is configured to perform step S405, and the frame processing module 803 is configured to perform step S407.

For another example, when the device 800 is configured to perform the method performed by the device N3 in FIG. 4, steps performed by the modules 801 to 803 are as described above and are not described again. The difference is that the transceiver and detection module 801 is further configured to perform step 409. When the device 800 is configured to perform the method performed by the device N4 in FIG. 4, the transceiver and detection module 801 is configured to perform the step of receiving another optical signal, and the frame processing module 803 is configured to perform step S411 and step 413.

For still another example, when the device 800 is configured to perform the method performed by the device N4 in FIG. 6, the frame processing module 803 is configured to perform step S601, and the transceiver and detection module 801 is configured to perform step 603. When the device 800 is configured to perform the method performed by the device N5 in FIG. 6, the transceiver and detection module 801 is configured to receive an optical signal, the frame processing module 803 is configured to perform step S605 and step 607, and the filtering module 802 is configured to perform step S609.

It should be noted that, in the specific implementations described above, the protection switching module 804 is configured to perform subnetwork connection switching. In addition, the device 800 may have a combined function of the specific implementations described above. For example, the filtering module 802 in the device 800 is configured to perform step S405 in FIG. 4 and step S609 in FIG. 6. An advantage of this design is that the device 800 may be configured to prevent itself from incorrect protection switching, and reduce a possibility of incorrect switching performed by a downstream device and even avoid incorrect switching by quickly detecting a fault and sending information to the downstream device.

It should also be noted that the transceiver and detection module 801, the filtering module 802, and the frame processing module 803 may be located on the tributary board 301 shown in FIG. 2; or, the three modules may be located on the line board 303. The protection switching module 804 may be located on the cross-connect board 302 or the system control and communication board 304.

Figure 9:
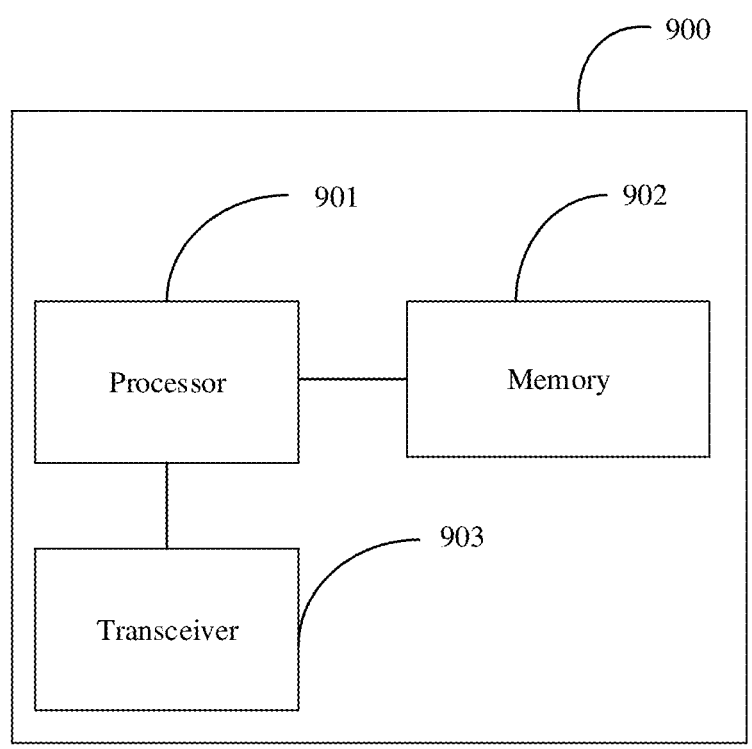
FIG. 9 is a schematic diagram of a possible structure of a signal processing apparatus according to an embodiment of this application.

FIG. 9 is a schematic diagram of a possible structure of a signal processing apparatus according to an embodiment of this application. As shown in FIG. 9, the signal processing apparatus 900 includes a processor 901, a memory 902, and a transceiver 903. The processor 901 is coupled to the memory 902. The processor 901 is coupled to the transceiver 903.

The transceiver 903 is configured to send and/or receive an optical signal. The processor 901 is configured to implement the method steps except for sending and receiving the optical signal in the foregoing embodiments. Correspondingly, corresponding program code executed by the processor 901 is stored in the memory 902. Coupling in this embodiment of this application is an indirect coupling or a communication connection between apparatuses, units, or modules, may be in an electrical form, a mechanical form, or another form, and is used for information exchange between the apparatuses, the units, or the modules.

The processor 901 may be a general-purpose processor, a digital signal processor, an application-specific integrated circuit, a field programmable gate array or another programmable logic device, a discrete gate or transistor logic device, or a discrete hardware component. The processor 901 may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software unit. The memory 902 may be a non-volatile memory, for example, a hard disk drive (hard disk drive, HDD), or may be a volatile memory (volatile memory), for example, a random access memory (random access memory, RAM). The memory 902 is any other medium that can carry or store expected program code in a form of an instruction or a data structure and that can be accessed by a computer, but is not limited thereto.

Based on the forgoing embodiments, an embodiment of this application further provides a computer-readable storage medium. The storage medium stores a software program. When the software program is read and executed by one or more processors, the method provided in any one or more of the foregoing embodiments may be implemented. The computer-readable storage medium may include any medium that can store program code, such as a USB flash drive, a removable hard disk, a read-only memory, a random access memory, a magnetic disk, or an optical disc.

Based on the forgoing embodiments, an embodiment of this application further provides a chip. The chip includes a processor, configured to implement the functions in any one or more of the foregoing embodiments, for example, the method steps shown in FIG. 3. Optionally, the chip further includes a memory. The memory is configured to store a program instruction and data that are necessary and executed by the processor. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

Clearly, a person skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. An electrical layer subnetwork connection protection method, wherein the method comprises:
   determining, by a network device comprising a processor, signal status information based on a power of an obtained optical signal, wherein the signal status information is used to indicate a state of a subnetwork connection carrying the optical signal;
   filtering, by the network device, the signal status information based on a preset first threshold, wherein the first threshold indicates a minimum duration in which the optical signal is in a valid state; and
   determining, by the network device based on the filtered signal status information, whether to switch a currently used first clock to a second clock different from the clock, wherein the first clock or the second clock is used to initialize connection monitoring information in response to the determination of whether to switch the currently used first clock to the second clock.

2. The electrical layer subnetwork connection protection method according to claim 1, wherein the determining, by the network device, the signal status information based on the power of the obtained optical signal comprises:
   determining, by the network device, the signal status information based on a power value of the optical signal; or
   converting the optical signal into an electrical signal, and determining, by the network device, the signal status information based on an amplitude of the electrical signal.

3. The electrical layer subnetwork connection protection method according to claim 1, wherein the method further comprises:
  switching the currently used first clock to the second clock after the network device determines to switch the currently used first clock; and
  initializing the connection monitoring information by using the second clock after the switching.

4. The electrical layer subnetwork connection protection method according to claim 1, wherein the method further comprises:
  obtaining, by the network device, additional connection monitoring information from the optical signal;
  determining, by the network device, additional status information of the subnetwork connection based on the additional connection monitoring information; and
  determining valid status information of the subnetwork connection based on a preset second threshold and the additional status information of the subnetwork connection, wherein the valid status information is used to determine whether the network device performs protection switching on the subnetwork connection, and the second threshold indicates a minimum duration in which the subnetwork connection is in a valid state.

5. The electrical layer subnetwork connection protection method according to claim 4, wherein the determining the valid status information of the subnetwork connection based on the preset second threshold and the additional status information of the subnetwork connection specifically comprises:
  determining an instantaneous state of the subnetwork connection for a plurality of times within the preset second threshold; and
  in response to one of the plurality of instantaneous states of the subnetwork connection being different from another instantaneous state, determining that the valid status information of the subnetwork connection is that the subnetwork connection is normal.

6. The electrical layer subnetwork connection protection method according to claim 4, wherein the determining the valid status information of the subnetwork connection based on the preset second threshold and the additional status information of the subnetwork connection comprises:
  determining that an instantaneous state of the subnetwork connection is a first state, wherein the first state is that the subnetwork connection is faulty, or the first state is that the subnetwork connection is degraded;
  after waiting for the preset second threshold, determining that the status information of the subnetwork connection is a second state; and
  in response to the second state being different from the first state, determining that the valid status information of the subnetwork connection is that the subnetwork connection is normal.

7. The electrical layer subnetwork connection protection method according to claim 4, wherein the additional status information of the subnetwork connection comprises one or more of the following states: the subnetwork connection is normal, the subnetwork connection is faulty, and the subnetwork connection is degraded.

8. The electrical layer subnetwork connection protection method according to claim 4, wherein at least one of the connection monitoring information or the additional connection monitoring information is carried in a data frame, and the data frame is an optical transport unit frame, a flexible optical transport network frame, a flexible Ethernet frame, or a synchronous digital signal frame.

9. The electrical layer subnetwork connection protection method according to claim 1, wherein the connection monitoring information comprises one or more of the following overheads: a status indication, a trail trace identifier, or bit-interleaved parity.

10. The electrical layer subnetwork connection protection method according to claim 1, wherein the signal status information comprises one or more of the following states: a signal normal state or a signal failure state.

11. A signal processing apparatus,
comprising:
a processor; and
a memory having instructions stored thereon that, when executed by the processor, cause the signal processing apparatus to:
determine signal status information based on a power of an obtained optical signal, wherein the signal status information is used to indicate a state of a subnetwork connection carrying the optical signal;
filter the signal status information based on a preset first threshold, wherein the first threshold indicates a minimum duration in which the optical signal is in a valid state; and
determine, based on the filtered signal status information, whether to switch a currently used first clock to a second clock different from the clock, wherein the first clock or the second clock is used to initialize connection monitoring information in response to the determination of whether to switch the currently used first clock to the second clock.

12. The signal processing apparatus according to claim 11, wherein the signal processing apparatus is caused to determine the signal status information based on the power of the obtained optical signal by:
  determining the signal status information based on a power value of the optical signal; or
  converting the optical signal into an electrical signal, and determining the signal status information based on an amplitude of the electrical signal.

13. The signal processing apparatus according to claim 11, wherein the signal processing apparatus is further caused to:
  switch the currently used first clock to the second clock after determining to switch the currently used first clock; and
  initialize the connection monitoring information by using the second clock after the switching.

14. The signal processing apparatus according to claim 11, wherein the the signal processing apparatus is further caused to:
  obtain additional connection monitoring information from the optical signal;
  determine additional status information of the subnetwork connection based on the additional connection monitoring information; and
  determine valid status information of the subnetwork connection based on a preset second threshold and the additional status information of the subnetwork connection, wherein the valid status information is used to determine whether the signal processing apparatus performs protection switching on the subnetwork connection, and the second threshold indicates a minimum duration in which the subnetwork connection is in a valid state.

15. The signal processing apparatus according to claim 14, wherein the signal processing apparatus is caused to determine the valid status information of the subnetwork connection based on the preset second threshold and the additional status information of the subnetwork connection by:
    determining an instantaneous state of the subnetwork connection for a plurality of times within the preset second threshold; and
    in response to one of the plurality of instantaneous states of the subnetwork connection being different from another instantaneous state, determining that the valid status information of the subnetwork connection is that the subnetwork connection is normal.

16. The signal processing apparatus according to claim 14, wherein the signal processing apparatus is caused to determine the valid status information of the subnetwork connection based on the preset second threshold and the additional status information of the subnetwork connection by:
    determining that an instantaneous state of the subnetwork connection is a first state, wherein the first state is that the subnetwork connection is faulty, or the first state is that the subnetwork connection is degraded;
    after waiting for the preset second threshold, determining that the status information of the subnetwork connection is a second state; and
    in response to the second state being different from the first state, determining that the valid status information of the subnetwork connection is that the subnetwork connection is normal.

17. The signal processing apparatus according to claim 11, wherein at least one of the connection monitoring information or the additional connection monitoring information is carried in a data frame, and the data frame is an optical transport unit frame, a flexible optical transport network frame, a flexible Ethernet frame, or a synchronous digital signal frame.

18. A communication system, comprising:
    a first network device comprising a first processor; and
    a second network device comprising a second processor, wherein
    the first network device is configured to:
        receive an optical signal;
        determine signal status information based on a power of the optical signal,
        wherein the signal status information is used to indicate a state of a first subnetwork connection carrying the optical signal;
        filter the signal status information based on a preset first threshold, wherein the first threshold indicates a minimum duration in which the optical signal is in a valid state;
        determine, based on the filtered signal status information, first clock or the second clock is used to initialize connection monitoring information in response to the determination of whether to switch the currently used first clock to the second clock; and
        send the connection monitoring information after initializing the connection monitoring information to the second network device, and
    the second network device is configured to:
        receive the connection monitoring information;
        determine status information of a second subnetwork connection based on the connection monitoring information, wherein the second subnetwork connection is between the first network device and the second network device; and
        determine valid status information of the second subnetwork connection based on a preset second threshold and the status information of the second subnetwork connection, wherein the valid status information is used to determine whether the second network device needs to perform protection switching on the second subnetwork connection, and the second threshold indicates a minimum duration in which the second subnetwork connection is in a valid state.

19. The communication system according to claim 18, wherein the second network device is configured to determine the valid status information of the second subnetwork connection based on the preset second threshold and the status information of the second subnetwork connection by:
    determining an instantaneous state of the second subnetwork connection for a plurality of times within the preset second threshold; and
    in response to one of the plurality of instantaneous states being different from another instantaneous state, determining that the valid status information is that the second subnetwork connection is normal.

20. The communication system according to claim 18, wherein the second network device is configured to determine the valid status information of the second subnetwork connection based on the preset second threshold and the status information of the second subnetwork connection by:
    determining that an instantaneous state of the second subnetwork connection is a first state, wherein the first state is that the second subnetwork connection is faulty, or the first state is that the second subnetwork connection is degraded;
    after waiting for the preset second threshold, determining that an instantaneous state of the second subnetwork connection is a second state; and
    in response to the second state being different from the first state, determining that the valid status information is that the second subnetwork connection is normal.

* * * * *